United States Patent [19]
Dehnert et al.

[11] 3,893,895
[45] July 8, 1975

[54] DISTILLATION OF 1,2-UNSATURATED CARBOXYLIC ACIDS IN SOLUTION WITH SELECTED AMINES

[75] Inventors: Jurgen Dehnert, Bruhl; Axel Kleemann; Theodor Lussling, both of Grossauheim; Ewald Noll, Grosskrotzenburg; Hans Schaefer; Gerd Schreyer, both of Grossauheim, all of Germany

[73] Assignee: Deutsche Gold- und Silber-Scheideanstalt vormals Roessler, Germany

[22] Filed: July 19, 1973

[21] Appl. No.: 380,664

[30] Foreign Application Priority Data
July 19, 1972 Germany............................ 2235326

[52] U.S. Cl. ............. 203/59; 260/526 N; 260/499; 203/38; 203/DIG. 21
[51] Int. Cl.² ........................................... B01D 3/34
[58] Field of Search ................ 203/38, 59, DIG. 21, 260/526 N, 290 V, 499

[56] References Cited
UNITED STATES PATENTS

| | | | |
|---|---|---|---|
| 2,375,036 | 5/1945 | Pierotti et al. | 203/59 |
| 2,386,365 | 10/1945 | Staudinger et al. | 203/58 |
| 2,414,639 | 1/1947 | Engs et al. | 203/59 |
| 2,609,387 | 9/1952 | Basdekis et al. | 260/499 |
| 3,274,231 | 9/1966 | Kobayashi et al. | 260/290 V |
| 3,337,740 | 8/1967 | Gray | 260/526 N |
| 3,344,144 | 9/1967 | Kobayashi et al. | 260/526 N |
| 3,478,093 | 11/1969 | Nonnenmacher et al. | 260/526 N |
| 3,639,466 | 2/1972 | Leichtle et al. | 260/526 N |
| 3,674,651 | 7/1972 | Otsuki et al. | 203/59 |
| 3,725,208 | 4/1973 | Maezawa et al. | 203/59 |
| 3,798,264 | 3/1974 | Kubota et al. | 203/15 |

*Primary Examiner*—Norman Yudkoff
*Assistant Examiner*—Frank Sever
*Attorney, Agent, or Firm*—Cushman, Darby & Cushman

[57] ABSTRACT

1,2-Unsaturated carboxylic acids having carbonyl compound impurities are separated by binding the carbonyl compounds with inorganic, aliphatic or aromatic amines and then distilling the acids.

15 Claims, No Drawings

DISTILLATION OF 1,2-UNSATURATED CARBOXYLIC ACIDS IN SOLUTION WITH SELECTED AMINES

The present invention is directed to a process of purifying 1,2-unsaturated carboxylic acid from carbonyl compounds, i.e., aldehydes and ketones, by distillation.

Generally, 1,2-unsaturated carboxylic acid is produced by catalytic oxidation of alkenes or alkenals in the gas phase and separated from the reaction gases by absorption in water. The resulting aqueous solution contains in addition to the unsaturated carboxylic acids various byproducts, especially carbonyl compounds, i.e., aldehydes and ketones.

It is known to extract the aqueous solutions with organic solvents in order to recover the unsaturated acids from the aqueous solutions and to purify the acids from the byproducts and to fractionate the extract by distillation (see Brown, British Pat. No. 995,472, and German Pat. No. 1,493,325). In these processes the purification of the unsaturated acids from the carbonyl compounds is possible to only a limited extent. Since carbonyl compounds interfer in transforming the unsaturated acids into polymers and plastics and are causes for the formation of less valuable products, the unsaturated carboxylic acids recovered by the known processes are unsuited for the production of polymers.

There has now been found a distillation process for the purification of 1,2-unsaturated carboxylic acids from carbonyl compounds, i.e., aldehydes and ketones, by binding the carbonyl compounds with inorganic, aliphatic or aromatic amines and then separating the carboxylic acid by distillation. According to this process by the addition of small amounts of amines, which concerns simple, easily accessible compounds, it is possible to recover the unsaturated carboxylic acids so extensively free of carbonyl compounds that they are outstandingly suitable as the starting materials for the production of polymers.

It is, of course, known that carbonyl compounds are bound with amine derivatives, the so-called carbonyl reagents such as hydrazine, hydroxylamine, phenylhydrazine and semicarbazide L. F. Fieser and M. Fieser, "Lehrbuch der organischen Chemie," Verlag Chemie, Weinheim, 1954, 224–225; and Fieser and Fieser "Organic Chemistry" 3rd edition Reinhold (1956) pages 211–213) and to react furfural with aromatic amines such as aniline (Berichte Vol. 38 (1905) pages 3824 to 3829). On the other hand, however, it is known that amines attach easily to carboxylic acids (Houben-Weyl Vol. 11 Part 1 (1957) pages 277–284). Surprisingly it has been found by the process of the invention that despite the presence of large amounts of unsaturated carboxylic acids, the small amounts of carbonyl compounds i.e., aldehydes and ketones, are completely bound through correspondingly small amounts of amines.

The process of invention is suited for the purification of 1,2-unsaturated carboxylic acids (e.g., alkenoic acids), preferably those 1,2-unsaturated carboxylic acids having 3 to 6 carbon atoms in the chain, especially those having 3 to 4 carbon atoms such as acrylic acid and methacrylic acid. Other unsaturated acids which can be purified include ethacrylic acid, crotonic acid, alpha hexenoic acid, crotonic acid. The acids can be of customary origin. It is suitable to largely preliminarily purify the unsaturated carboxylic acid by customary measures such as extraction and distillation before use of the process of the invention, especially to reduce the content of carbonyl compounds, i.e., aldehydes and ketones below 5%, if possible to below 2%.

The process of the invention is especially suited to the purification of all unsaturated carboxylic acid produced by gas phase oxidation of an alkene or alkenal and which are largely freed of byproducts by known processes. These types of recovered unsaturated carboxylic acids generally contain less than 2%, for the most part less than 1% of carbonyl compounds. The carbonyl compounds for example in the case of acrylic acid are acrolein formaldehyde, acetaldehyde and furfural. Other carbonyl compounds which can be removed include for example, methacrolein, crotonaldehyde, hexen-2-al, acetone, etc.

Unless otherwise indicated, all parts and percentages are by weight.

In order to carry out the process of the invention the unsaturated carboxylic acids to be purified from the carbonyl compounds are first treated with amines. Thus, there can be used inorganic amines, primary and secondary, aliphatic and aromatic amines such as hydrazine, hydroxylamine, 1,2-ethanolamine, 1,2-ethylene diamine, octyl amine, 1,3-propanolamine, 1,2-propanolamine, octodecyl amine, aniline, p-phenylenediamine, o-phenylene diamine, 1,2-dianilinoethane, alpha naphthyl amine, beta naphthyl amine, p-methyl aniline, o-methyl aniline, N-methyl aniline, semi-carbazide, phenyl hydrazine, 2,4-dimethyl aniline. Preferably there are used amines whose boiling point is above 100° C at atmospheric pressure. Especially suitable is aniline. For each equivalent of carbonyl compound there is generally used about 0.5 to 5 equivalents, preferably 1 to 3 equivalents of amine.

The temperature and reaction time for treating the unsaturated carboxylic acid with the amine to a certain extent are dependent on each other and also are adjusted in a given case according to the amount and type of substances present in the reaction, especially the carbonyl compounds and amine. Generally, the treatment is carried out at temperatures between about 0° and 100° C., especially between 0° and 50° C., for example in the case of using aniline as the amine the preferred temperature is between 10° and 30° C. There is generally required for the treatment at least several minutes, at times several hours, in most cases about 5 to 60 minutes.

After the treatment with the amine the unsaturated carboxylic acid is separated from the other components by fractional distillation which is preferably carried out at reduced pressure, e.g., 10 Torr to 250 Torr. The forerun occurring in this distillation contains the water formed by the reaction of the carbonyl compounds with the amines; the residue contains the carbonyl compounds bound to amine.

If necessary either before or during the distillation there are added customary polymerization inhibitors such as hydroquinone or hydroquinone monomethyl ether. Although it is generally suitable for the treatment of the acid with the amine to be separate from the distillation it is possible, for example, in a continuous method, to bring the amine into contact with the acid only in the distillation apparatus.

It can be advantageous to carry out the distillation in the presence of a solvent for the carboxylic acid having a higher boiling point than the unsaturated carboxylic acid. For example, there can be used hydrocarbons, e.g., xylene, ethyl benzene, tetrahydronaphthalene (Tetralin), decahydronaphthalene, decane. The preferred solvents are alcohols such as n-octanol, hexanol, cyclohexanol, methyl cyclohexanol, (e.g., 2-methylcyclohexanol), decanol, isodecyl alcohol, dodecanol, 2-ethylhexanol or esters of these or other alcohols with carboxylic acids, especially the unsaturated acid being purified. Examples of such esters include octyl acrylate, octyl methacrylate, cyclohexyl methacrylate, 2-methylcyclohexyl acrylate, decyl acrylate, 2-ethylhexyl acrylate, isodecyl methacrylate, dodecyl acrylate, hexyl acrylate, hexyl methacrylate, dodecyl methacrylate, octyl crotonate, cyclohexyl ethacrylate, octyl acetate, hexyl acetate, ethyl propionate, butyl butyrate, methyl valerate, etc. The solvent, of course, should be inert to the unsaturated acid under the conditions of distillation. The solvents can generally be present in customary relative proportions since the ratio is not critical. In the case of acrylic acid and methacrylic acid it has proven especially favorable to use 2-ethylhexanol-1 as the solvent and to add 1 to 10 times as much solvent as carboxylic acid.

The solvent can be added to the unsaturated acid in a given case before or during the distillation; however, the solvent can also be present during the treatment of the acid with the amine. For example, it is possible in those cases where the unsaturated acid has been recovered previously by an extraction with the corresponding solvent to treat the carboxylic acid in this extract with the amine and then to separate from the extract by distillation.

EXAMPLE 1

There were added 9 grams of 1,2-ethanolamine to 191 grams of acrylic acid having a purity of 98.6% purity which contained a total of 0.31% of carbonyl compounds (these were determined by precipitation with 2,4-dinitrophenylhydrazine and calculated as formaldehyde)*. The temperature was held at 15°C. After 30 minutes the mixture was distilled at 9 to 10 torr. A forerun which contained water formed by the reaction of the amine with the carbonyl compounds was followed at 43° C. by acrylic acid of 99.7% purity having a total carbonyl content of 0.003% calculated as formaldehyde. The gas chromatographic analysis of the acrylic acid gave no indication of the presence of acrolein or furfural.

* of the 0.31% carbonyl compounds were 0.12% acrolein and 0.33% furfural

EXAMPLE 2

The procedure of Example 1 was followed except there were used 5 grams of 1,2-ethylenediamine. There was recovered acrylic acid having a purity of 99.5% with a total carbonyl content of 0.001% calculated as formaldehyde. Acrolein and furfural were not detectable.

EXAMPLE 3 a. There were added 9 grams of aniline to 300 grams of acrylic acid having a purity of 98.5% which contained a total of 0.34% carbonyl compounds calculated as formaldehyde, of the 0.34% carbonyl compounds were 0.19% acrolein and 0.25% furfural. The temperature was held at 21° C. After 30 minutes the mixture was distilled at 9 to 10 torr. The results were as set forth in Table 1.

b. In a comparison distillation there was employed the same acrylic acid which had not been treated with aniline. The results are set forth in Table 2.

TABLE 1

| Fraction | Amount Grams | Acrylic Acid | Water | Acrolein | Furfural | Carbonyl* |
|---|---|---|---|---|---|---|
| 1 | 50 | 95.81 | 3.58 | <0.01 | 0.02 | 0.005 |
| 2 | 100 | 99.53 | 0.14 | <0.01 | 0.02 | 0.005 |
| 3 | 100 | 99.60 | 0.05 | 0 | 0.02 | 0.006 |

*sum of the carbonyl compounds calculated as formaldehyde

TABLE 2

| Fraction | Amount Grams | Acrylic Acid | Water | Acrolein | Furfural | Carbonyl* |
|---|---|---|---|---|---|---|
| 1 | 100 | 95.74 | 3.30 | 0.26 | 0.27 | 0.42 |
| 2 | 200 | 99.21 | 0.16 | <0.01 | 0.22 | 0.13 |
| 3 | 200 | 99.32 | 0.06 | <0.01 | 0.25 | 0.14 |

*sum of the carbonyl compounds calculated as formaldehyde

EXAMPLE 4

Fraction 2 from Example 3(b) was treated with 3 grams of 1,2-dianilinoethane. The temperature was held at 20°C. After 30 minutes the mixture was distilled at 9 to 10 Torr. A forerun was followed by acrylic acid of 99.6% purity at 43° C. and having a total carbonyl content of 0.03% calculated as formaldehyde.

EXAMPLE 5

There was employed a distillation column having a height of 6 meters whose clear width was 100 mm in the lower half and 80 mm in the upper half. Up to a height of 1 meter the column was provided with packing, in the remainder there were uniformly distributed 25 bubble trays. The acrylic acid to be purified contained a total of 0.33% of carbonyl compounds calculated as formaldehyde and individually 1.65% water, 0.09% acrolein and 0.41% furfural. 1.9 kilograms of the acrylic acid were mixed with 8.1 liters of 2-ethylhexanol-1, 80 grams of hydroquinone monomethyl ether and 40 grams of aniline. The mixture was first kept for 1 hour at 20° C. and then inserted into the middle of the column, namely there were fed in hourly 4,0 liter of the mixture. Additionally there were added hourly to the top of the column 0.4 liter of a solution of 400 grams of hydroquinone monomethyl ether in 5 liters of pure acrylic acid. The pressure in the column was kept at 20 Torr. The column was so operated that the reflux ratio was 1 to 4 and there was recovered hourly as the distillate 0.2 kilograms of impure acrylic acid at 48° C. from the top of the column and 0.9 kilograms of pure acrylic acid at 67° to 68° C. at a side outlet 1 meter below the top of the column. The pure acrylic acid recovered had a purity of 99.6% and had a total carbonyl content of less than 0.005% calculated as formaldehyde.

EXAMPLE 6

The same procedure was employed as in Example 5 except the column was operated at a pressure of 10 Torr without reflux and there were fed into the middle of the column hourly 4 liters of a solution of 20 grams of hydroquinone monomethyl ether in 10 liters of 2-ethylhexanol-1 and to the head of the column there was fed hourly 1 liter of a mixture made one hour before from 6.2 liters of 2-ethylhexanol-1, 3.8 kilograms of acrylic acid, 160 grams of hydroquinone monomethyl ether and 80 grams of aniline, as well as 0.2 kilograms of a solution of 400 grams of hydroquinone monomethyl ether in 5 kilograms of pure acrylic acid. Distillate was withdrawn only from the top of the column, at temperatures from 66° to 75° C. There passed over hourly 1.05 kilograms of a mixture of acrylic acid and 2-ethylhexanol-1 which had a varying acrylic acid content of 47 to 64%. The acrylic acid recovered had a total content of carbonyl compounds of 0.004 to 0.013% calculated as formaldehyde.

What is claimed is:

1. A process for the purification of 1,2-unsaturated carboxylic acids containing carbonyl compounds comprising treating the impure carboxylic acid with an amine which is selected from the group consisting of hydroxylamine, a monoalkyl amine, naphthylamine and 1,2-dianilinoethane to chemically bind said carbonyl compounds and then recovering said carboxylic acid by distillation.

2. A process according to claim 1 wherein the amine is hydroxylamine.

3. A process according to claim 2 wherein the unsaturated carboxylic acid is an aliphatic carboxylic acid having 3 to 6 carbon atoms.

4. A process according to claim 2 wherein the unsaturated acid has 3 to 4 carbon atoms.

5. A process according to claim 4 wherein the acid is selected from the group consisting of acrylic acid and methacrylic acid.

6. A process according to claim 1 wherein the amine has a boiling point above 100° C.

7. A process according to claim 6 wherein the acid is selected from the group consisting of acrylic acid and methacrylic acid.

8. A process according to claim 1 wherein the amine is 1,2-dianilino-ethane.

9. A process according to claim 1 wherein the unsaturated carboxylic acid is treated with the amine at a temperature between 0° and 50° C.

10. A process according to claim 1 wherein the distillation is carried out in solution with a solvent having a higher boiling point than the unsaturated carboxylic acid.

11. A process according to claim 10 wherein 1 to 10 parts of solvent are employed per part of unsaturated carboxylic acid.

12. A process according to claim 1 wherein 0.5 to 5 equivalents of amine compound are used per equivalent of carbonyl compound.

13. A process according to claim 1 wherein the amine is hydroxylamine.

14. A process according to claim 1 wherein the amine is a monoalkyl amine.

15. A process according to claim 1 wherein the amine is naphthylamine.

* * * * *